United States Patent [19]

Haas et al.

[11] Patent Number: 5,310,070
[45] Date of Patent: May 10, 1994

[54] CONTAINER OF READILY BIODEGRADABLE MATERIAL

[75] Inventors: Johann Haas, Klosterneuburg; Franz Haas, Leobendorf; Franz Haas, Vienna, all of Austria

[73] Assignee: Franz Haas Waffelmaschinen Industriegesellschaft m.b.H., Leobendorf, Austria

[21] Appl. No.: 953,993

[22] Filed: Sep. 30, 1992

[30] Foreign Application Priority Data

Oct. 1, 1991 [AT] Austria .................. 1973/91

[51] Int. Cl.⁵ .................................. B65D 21/02
[52] U.S. Cl. ......................... 220/4.24; 220/366; 220/307; 229/901; 229/120
[58] Field of Search .......... 426/138, 139, 118; 220/4.24, 4.21, 913, 366, 306, 307; 229/120, 901, DIG. 14

[56] References Cited

U.S. PATENT DOCUMENTS

| | | | |
|---|---|---|---|
| 1,552,671 | 9/1925 | Bellocchio | 426/139 |
| 3,902,540 | 9/1975 | Commisso | 220/4.24 |
| 4,576,309 | 3/1986 | Tzifkansky et al. | 220/366 |
| 4,577,760 | 3/1986 | Rainin et al. | 220/366 |
| 4,600,117 | 7/1986 | Tzifkansky et al. | 220/366 |
| 4,883,195 | 11/1989 | Ott et al. | 220/366 |
| 4,974,738 | 12/1990 | Kidd et al. | 220/4.24 |
| 5,060,851 | 10/1991 | Lorenz | 229/901 |
| 5,111,362 | 5/1992 | Flamm et al. | 220/4.24 |

FOREIGN PATENT DOCUMENTS

392243B 2/1991 Austria .

*Primary Examiner*—Allan N. Shoap
*Assistant Examiner*—S. Castellano
*Attorney, Agent, or Firm*—Herbert Dubno

[57] ABSTRACT

A biodegradable container baked from a waffle material is composed of a pair of half shells each of which has a pair of lugs for flaps engaging in recesses of the other half shell and formed with ribs along generatrices of the respective side wall having detent recesses engageable by bulges or beads of the recesses of the other half shell. Additional ribs can be provided for stiffening purposes. The container is useful for foods distributed at fast-food restaurants or the like.

14 Claims, 1 Drawing Sheet

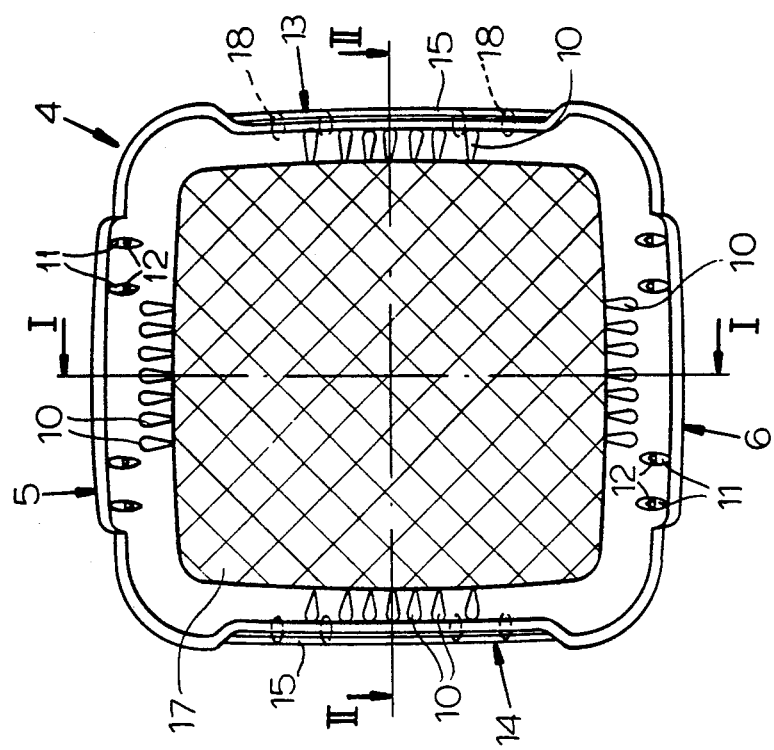
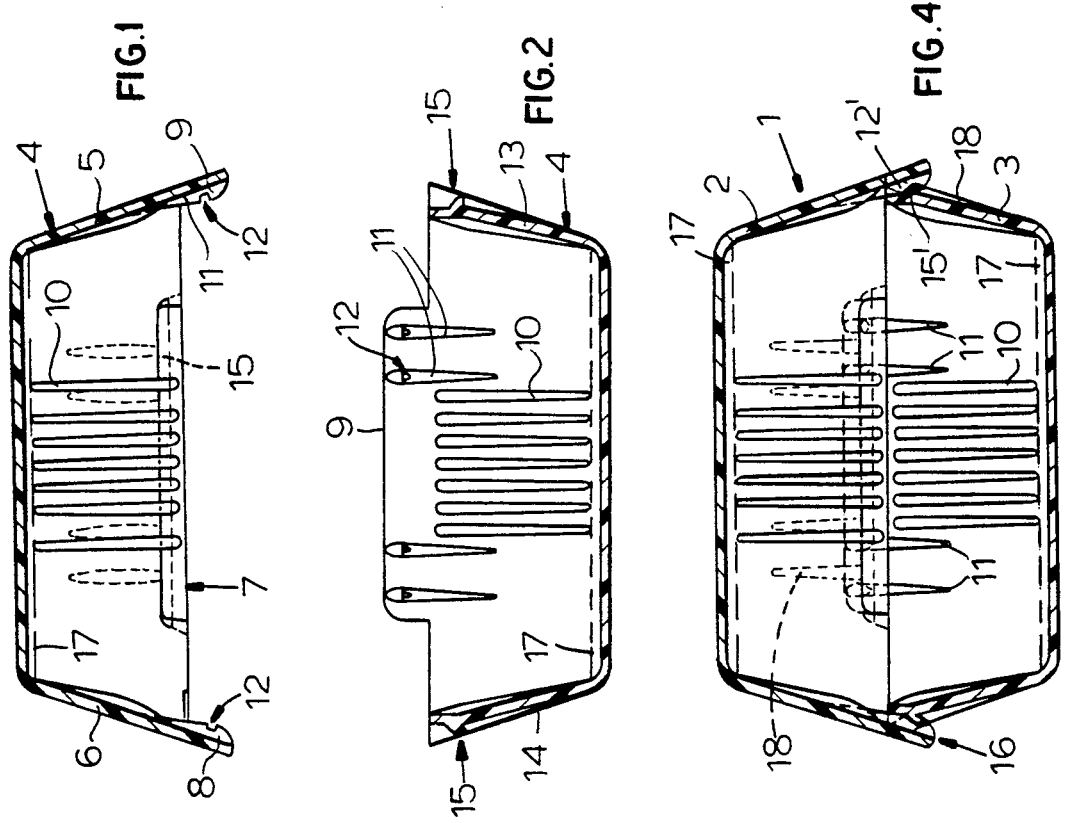

CONTAINER OF READILY BIODEGRADABLE MATERIAL

FIELD OF THE INVENTION

Our present invention relates to a container of a material which is readily biodegradable, i.e. capable of decomposing or rotting rapidly, and which can be used to receive foodstuffs and yet does not pose an environmental hazard.

BACKGROUND OF THE INVENTION

It is known to provide a container having two half shells which are joined together to receive a product. The half shells may be connected by a flap arrangement with one half shell interfitting with another.

Such receptacles are used as packaging for foodstuffs, e.g. in fast-food establishments. In the past such containers have been largely composed of foamed synthetic resin material and environmental concerns have been increasingly directed to such materials to the point that there is considerable interest in the development of more readily biodegradable packaging materials for such uses.

In particular, it has been suggested to use baked waffle-like starchy compositions as the material for such containers. However, such containers must be capable of retaining their shape, must be resistant to heat and must be reliably closable.

Furthermore, the container must be a mass-producible product of relatively low cost, easily manipulated, and capable of being utilized in the fast-food environment.

In a known device for accommodating meat products, a one-piece container has been provided with two half shells interconnected by a bent strip elastically. In another earlier construction, two separate half shells are provided with hook systems interengageable with one another and capable of being snapped together. When the half shells are, however, transported empty and are subjected to repeated opening and closing, the forms utilized for locking the half shells together tend to break off. As a consequence, these earlier systems were not fully satisfactory.

Austrian Patent 392 243 shows a two-shell container of readily biodegradable material which can be formed from densely baked waffle compositions predominantly of a starch base. The container halves are provided with locking elements along their edges to form a snap closure. This system cannot, however, withstand substantial loading.

OBJECTS OF THE INVENTION

It is, therefore, the principal object of the present invention to provide an improved container for the purposes described which can be readily and economically fabricated by waffle-type baking from a waffle composition having a high starch content and which, however, is free from the drawbacks of the earlier systems described.

Another object of this invention is to provide an improved container for foodstuffs which can withstand substantial force, can be repeatedly opened and closed without difficulty, can be readily mass-produced and transported in the open or separated condition and which in general, is free from the disadvantages of earlier packaging material.

SUMMARY OF THE INVENTION

These objects are attained, in accordance with the invention, by providing two half shells of the readily decomposable material, namely, a baked-waffle composition of a high-starch material as described, for example, in the aforementioned Austrian patent, wherein each half shell is formed with ribs extending along the walls thereof substantially from the mouth of the half shell to the bottom thereof parallel to generatrices of the half shell.

According to the invention, at two opposite walls of the half shell, projecting lugs or flaps are provided which overhang the rim of the other half shell when the two half shells are fitted together, ribs extending along the side walls of the pair and being formed with detent recesses which are engaged by bulges or beads running along or parallel to the rim of the side walls of the other half shell so that these beads engage in the detent recesses to provide the form-locking engagement of the two half shells when they are fitted together.

The two half shells can be identical to one another and can have their side walls tapering toward the bottom.

In a cylindrical or somewhat conical configuration of the half shells, the two pairs of side walls described can be two mutually-perpendicular sectors of the cylindrical or frustoconical wall. The two half shells can be fitted together by inverting one with respect to the other and rotating the two half shells through 90° relative to one another so that they can be fitted together mouth to mouth.

The pairs of walls can also be formed with angles of 120° from one another when, for example, three pairs of walls are provided with diametrically-opposite walls having the lugs or flaps and another pair of diametrically-opposite walls having beads or bulges. Six distinct wall zones are provided in this case.

In the case of a hexagonal configuration, moreover, three wall portions at 120° from one another can have the lugs or flaps which are engageable with three other wall zones also at 120° to one another when the two half shells are inverted and relatively rotated through 60°.

In a preferred embodiment, however, the half shells are of square outline with two pairs of walls being located at right angles to one another.

According to a feature of the invention, the walls provided with the ribs are formed with recesses of a width and width corresponding to the width and thickness of the lugs or flaps to snugly receive them, bead or bulge of each wall being formed toward the top of the respective recess.

Advantageously, the detent recesses are spaced outwardly from the walls on which their ribs are provided so that, when the bulge or bead engages in the detent recess, there nevertheless remains a venting clearance between the cover and the base to communicate between the outside atmosphere and the interior of the container.

Advantageously, further parallel ribs are provided on the side wall having the lugs, between pairs of ribs provided with the detent recesses, these additional ribs running to the bottom or base of the half shell.

More particularly, the container of the invention can comprise:

a pair of half shells composed of a readily biodegradable material, each of the half shells being formed unitarily from the material with two pairs of mutually opposite side walls and a bottom whereby one of the half shells can be inverted over the other of the half shells to form a base from the other half shell and a cover from the one of the half shells, one of the pairs of side walls being formed with flaps projecting beyond a plane of a rim of the side walls of the one pair, the side walls of the one of the pairs being provided with inwardly projecting ribs generally parallel to generatrices thereof and formed with detent notches, the other pair of walls each being externally formed with rectilinear bulges extending along the rim and engageable in the detent notches of the flaps of the other half shell upon engagement of the cover on the base.

BRIEF DESCRIPTION OF THE DRAWING

The above and other objects, features and advantages of the present invention will become more readily apparent from the following description, reference being made to the accompanying drawing in which:

FIG. 1 is a cross-sectional view through one of the half shells of the package of the invention taken generally along the line I—I of FIG. 3;

FIG. 2 is a cross-sectional view through the half shell of FIG. 1 but taken in a plane perpendicular to the sectional plane thereof generally along the section line II—II of FIG. 3;

FIG. 3 is a plan view of the half shell of FIGS. 1 and 2; and

FIG. 4 is a cross sectional view generally in a plane corresponding to the section plane of FIG. 1 through a package formed by substantially identical half shells in which the lower half shell is rotated through 90° with respect to the orientation of the upper half shell.

SPECIFIC DESCRIPTION

In the drawing, we have shown a package which is readily biodegradable and can be used to receive foodstuffs, e.g. for the distribution, dispensing and sale of fast foods in a fast-food restaurant or the like and comprised of two half shells 2, 3 (FIG. 4) which interfit to form the container or receptacle 1.

FIG. 1 shows a half shell 4 in the form of a cover for the receptacle and FIG. 2 shows an identical half shell 4, rotated through 90° about a vertical axis and through 180° about a horizontal axis with reference to the half shell of FIG. 1, forming a cup adapted to receive contents to be packaged.

Section I—I of FIG. 3 through the half shell 4 corresponds to the orientation of the cover shell shown in FIG. I and shows that the shell has two opposite side walls 5, 6 which are extended beyond the rim 7 of the half shell to form a pair of lugs or flaps 8, 9.

The side walls 5 and 6 are reinforced internally by vertical ribs 10 which extend inwardly along the inner sides of these walls. In addition, ribs 11 are provided which extend along the inner side of the flaps or lugs 8 or 9 to reinforce the latter and provide detent recesses 12 best shown in FIGS. 1 and 4.

FIGS. 2 and 3 indicate that each of the lugs 8, 9 is formed with four ribs 11, each of which has a detent recess 12 and which are provided in two pairs flanking the array of vertical reinforcing ribs 10 on the respective side walls 5, 6.

The half shell 4 is formed along the exterior of the side walls 13 and 14 which oppose one another and lie generally at a right angle to the side walls 5 and 6, respective horizontal edges beads 15 which can have the configuration of outwardly tapering teeth. These beads 15 are designed to engage in the complementarily-shaped detent recesses 12 when two such half shells, inverted with respect to one another and rotated relative to one another in the horizontal plane through 90° can be interfitted as shown in FIG. 4.

In FIG. 4, the recesses 121 engage the edge beads 15' in the assembled container. As can be seen from FIG. 2, the edge beads 15 extend the full width of the lugs 8, 9, within recessed zones of the side walls 13 and 14 which are likewise of the full width of the lugs 8, 9, the latter extending only over part of the width of the respective side walls 5, 6. Thus the engagement of the lugs 8 and in snuggly-fitting relationship within the recesses of the side walls 13 and 14, ensures that the connection of the two half shells can take up transverse forces and torque, while the engagement of the bulges 15 in the recesses 12 secure the cover on the base of the container against vertical separation until the cover is forceably pulled off the base.

In the region of the form-locking connection (engagement of the edge beads 15 in the detent recesses 12), because of the presence of the ribs 11, gaps 16 are provided as is clearly visible at the left side in FIG. 4, through which a venting of the interior of the container is assured. This venting allows heated air to escape when food is heated in the container or hot food is placed in the container and the container is closed, and air to enter the container to prevent the development of a vacuum therein as hot food cools. The venting also prevents an air cushion within the container from resisting application of the cover to the base. The ribs 10, 11, the edge beads 15 and a waffle-shaped contour of the bottom 17 reinforce the container and provide sufficient strength and reliability against inadvertent opening thereof.

Ribs 18 can be provided on the outer side of the container in the region of the recessed portions of the side walls 13 and 14 and the edge beads 15 can project at a right angle to these ribs 18. The ribs 18 can taper toward the bottom and extend all the way toward the bottom of the respective shell half.

The ribs 18 not only reinforce the side walls 13 and 14 and contribute to inadvertent opening of the container by the compression of these walls inwardly, but stiffen or reinforce the edge beads 15.

The container is designed especially for foods, can be produced in appropriate shaped waffle molds and can be composed of waffle compositions so that the container itself may be edible, if desired and, because of its high biodegradability, can be disposed of without creating an environmental hazard. It can be used with microwave and infrared heating to maintain the temperature of the contents of the container or the container itself.

We claim:

1. A container, comprising:
   a pair of identical half shells composed of a readily biodegradable material, each of said half shells being formed unitarily from said material with two pairs of mutually opposite side walls and a bottom wherein one of said half shells is inverted over the other of said half shells to form a base from said other half shell and a cover from said one of said half shells, one pair of side walls of each half shell being formed with flaps projecting beyond a plane of a rim of another pair of side walls of the half shell, each of said one pair of side walls being provided with a respective plurality of inwardly projecting and spaced apart ribs, said ribs terminating beyond said plane of the rim on said flaps and being generally parallel to generatrices thereof and formed with detent notches, said another pair of side walls each being externally formed with rectilinear bulges extending along said rim, said bulges of said one half shell being engageable in the detent notches of the flaps of the other half shell upon engagement of said cover on said base.

2. A container, comprising:

a pair of identical half shells composed of a radially biodegradable material, each of said half shells being formed unitarily from said material with two pairs of mutually opposite side walls and a bottom whereby one of said half shells can be inverted over the other of said half shells to form a base from said other half shell and a cover from said one of said half shells, one pair of side walls of each half shell being formed with flaps projecting beyond a plane of a rim of another pair of side walls of the half shell, each of said one pair of side walls being provided with inwardly projecting ribs generally parallel to generatrices thereof and formed with detent notches, said another pair of side walls each being externally formed with rectilinear bulges extending along said rim, said bulges of said one half shell being engageable in the detent notches of the flaps of the other half shell upon engagement of said cover on said base, another pair of side walls of each half shell being formed with recesses at said rim to receive said flaps, said recesses being externally formed with said bulges.

3. The container defined in claim 2 wherein said recesses are set inwardly by an amount equal substantially to a thickness of said flaps and have widths equal substantially to widths of said flaps.

4. The container defined in claim 1 wherein each of said half shells has a generally rectangular outline at a mouth thereof and tapers downwardly to the respective bottom, said one pair of side walls being substantially perpendicular to said another pair of side walls.

5. The container defined in claim 1 wherein said ribs project inwardly from respective side walls of said one pair and form respective spacings between said detent recesses and said respective side walls to form a venting clearance when said cover is engaged by said base.

6. The container defined in claim 1 wherein said one pair of side walls is provided with reinforcing ribs parallel to generatrices thereof and extending substantially to the respective bottom between the ribs provided with said detent notches.

7. A container comprising:

a pair of identical half shells composed of a readily biodegradable material, each of said half shells being formed unitarily from said material with two pairs of mutually opposite side walls and a bottom whereby one of said half shells can be inverted over the other of said half shells to form a base from said other half shell and a cover from said one of said half shells, one pair of side walls of each half shell being formed with flaps projecting beyond a plane of a rim of another pair of side walls of the half shell, each of said one pair of side walls being provided with inwardly projecting ribs generally parallel to generatrices thereof and formed with detent notches, said another pair of side walls each being externally formed with rectilinear bulges extending along said rim, said bulges of said one half shell being engageable in the detent notches of the flaps of the other half shell upon engagement of said cover on said base, the another pair of side walls of each of said half shell being each formed with recesses at said rim to receive said flaps, said recesses being externally formed with said bulges, reinforcing ribs on the outer sides of the side walls of said another pair of side walls being connected at right angles to said bulges and said reinforcing ribs extending substantially to the bottom of the respective half shell.

8. The container defined in claim 7 wherein said recesses are set inwardly by an amount equal substantially to a thickness of said flaps and have widths equal substantially to widths of said flaps.

9. The container defined in claim 8 wherein each of said half shells has a generally rectangular outline at a mouth thereof and tapers downwardly to the respective bottom, said one pair of side walls being substantially perpendicular to said another pair of side walls.

10. The container defined in claim 9 wherein a spacing is provided between said detent notches and the one pair of side walls provided with said ribs to form a venting clearance when said cover is applied to said base.

11. The container defined in claim 10 wherein one pair of side walls, is provided with reinforcing ribs parallel to generatrices thereof and extending substantially to the respective bottom between the ribs provided with said detent notches.

12. The container defined in claim 11 wherein each of said half shells is composed of a baked waffle material.

13. The container defined in claim 12 wherein said bulges extend along the respective rim.

14. The container defined in claim 12 wherein said bulges extend parallel to the respective rim.

* * * * *